Nov. 19, 1957  H. F. LIVERS  2,813,342
PIPE BEVELING MACHINE
Filed July 26, 1956  2 Sheets-Sheet 1

INVENTOR.
Harold F. Livers
BY
ATTORNEY

Nov. 19, 1957  H. F. LIVERS  2,813,342
PIPE BEVELING MACHINE
Filed July 26, 1956  2 Sheets-Sheet 2

INVENTOR.
Harold F. Livers
BY
ATTORNEY

United States Patent Office 2,813,342
Patented Nov. 19, 1957

2,813,342

PIPE BEVELING MACHINE

Harold F. Livers, Kansas City, Mo., assignor to Mary Catherine Harter, Tulsa, Okla.

Application July 26, 1956, Serial No. 600,201

2 Claims. (Cl. 33—21)

This invention relates to pipe cutting machines and more particularly, but not by way of limitation, to means for supporting a pipe beveling machine on a pipe in substantially perfect concentricity therewith in order to assure an efficient and substantially true beveling cut of the cutting machine during its travel around the pipe.

Pipe beveling machines of the type which support a cutting torch for circumferential movement about a pipe to effect annular cuts through the walls of the pipe are old and well known in the art, such as the prior patent to C. A. Mathey et al., No. 1,998,729, issued April 23, 1935, for "Pipe Cutting Apparatus" and the patent to P. A. Howard, No. 2,408,517, issued October 1, 1946, for "Pipe Cutting Apparatus." Such prior beveling machines utilize a saddle member for supporting the ring gear mechanism which cooperates with actuating gear members for moving the supported cutting torches circumferentially around the pipe in order to make annular cuts therein. In order to support the saddle members of these structures, it is customary to utilize a plurality of adjustable bolt members having their head members acting as feet for engaging the periphery of the pipe and cooperate with a plurality of variable sized washers retained by a nut holding the bolt and washers to the supporting saddle member. Consequently, when adjusting for a proper spacing of the saddle and a concentric position of the cutting machine saddle on a pipe, a variable number of washers may be utilized with the bolts in order to space the cutting machine and properly support it on the periphery of the pipe. After the bolts are adjusted, the saddle member is held by a combination of springs and chains extending on the underneath side of the pipe and anchored to each lower side of the saddle member, which is usual and old in the art. Many disadvantages are attendant in the use of bolts and the like for such type of adjustment, since the bolt heads are flat and during engagement of the pipe have a tendency to rock or swerve slightly. Secondly, a considerable number of washers must be carried of different sizes and multiples of the same size in order to obtain anything approaching a required concentricity of the saddle member. In instances where the concentricity is slightly off, it is difficult to get an efficient cut by the cutting torches and furthermore, the actuating gear mechanism will often get in a bind and be very hard to operate.

The present invention is concerned with an improvement in supporting the saddle member on machines of the type above mentioned, and particularly, to provide a new and positive spacer arrangement for supporting the saddle on the outer periphery of the pipe which will provide for greater efficiency of concentricity in maintaining the cutting machine on the pipe. The spacer members are of variable sizes to allow for use with variable sized pipe.

It is an important object of this invention to provide a spacer adapter for supporting cutting machines and the like on the outer periphery of the pipe in a face to face arcuate contact to provide an efficient concentricity therebetween in order to assure an efficient operation of the cutting machine.

And still another object of this invention is to provide a plurality of segmental space adapters for cooperation with a saddle member of a pipe beveling machine or the like in order to support the saddle member on the pipe without any undue distortion or misalignment of the saddle member respecting the periphery of the pipe.

Still another object of this invention is to provide a plurality of variable size segmental arcuately shaped spacer adapters for utilization with the saddle member of a pipe cutting machine adapted to be disposed on the outer periphery of the pipe in order to maintain the machine in substantial concentricity therewith and effect a proper cut of the cutting apparatus.

And still another object of this invention is to provide a plurality of variable sized spacer members cooperating with a supporting saddle member of a cutting machine which are simple in operation, economical to manufacture and durable.

Other objects and advantages of the invention will be evident from the following detailed description, read in conjunction with the accompanying drawings, which illustrate my invention.

Figure 1:
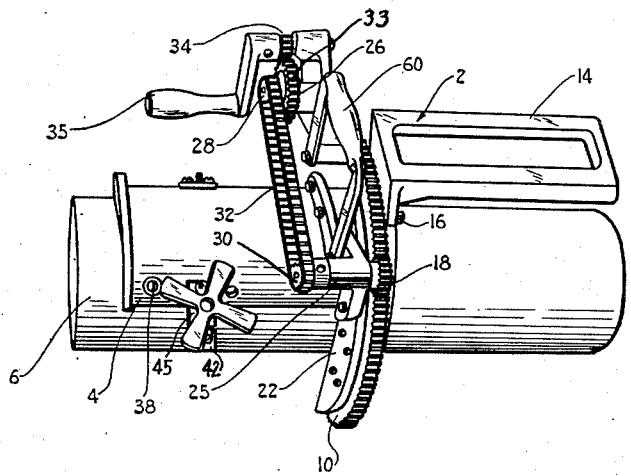
Figure 1 is a perspective view of a pipe cutting apparatus with certain parts omitted for clarity.
Figure 2:
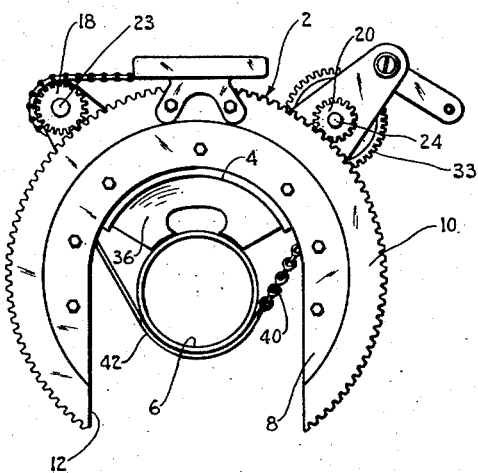
Figure 2 is an end elevational view taken from the front side of the machine and showing one of the spacers in position.
Figure 3:
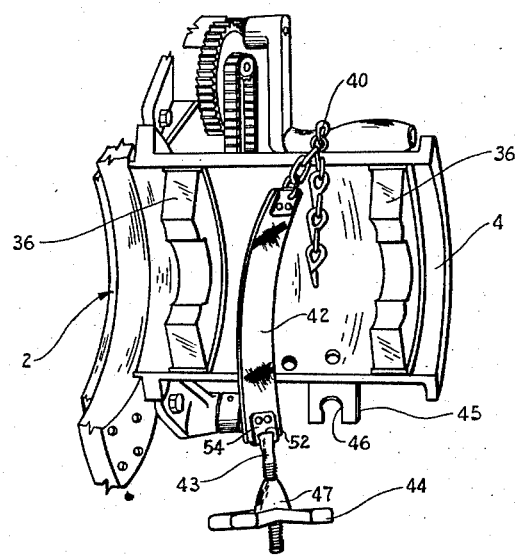
Figure 3 is a perspective view looking from the underneath side of the machine showing a pair of the adapters cooperating therewith.
Figure 4:
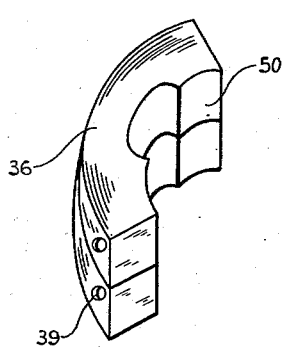
Figure 4 is a detail view in perspective of an adapter of one size.
Figure 5:
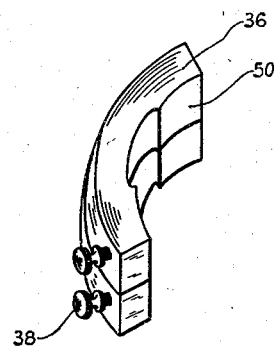
Figure 5 is a similar view of a variable sized adapter.

Referring to the drawings more in detail, and particularly Figs. 1, 2 and 3, reference character 2 represents the cutting apparatus generally which comprises an arcuately shaped saddle member 4 adapted to straddle a pipe 6 in the well known manner. The saddle member at one end cooperates with a U-shaped member 8 providing a track (not shown) for supporting the annular ring gear 10 similar to that shown in the prior patents mentioned.

The supporting track member 8 is provided with a slotted throat 12 in order to pass over the pipe when the saddle 4 and the cutting apparatus are placed thereon. The opposite side of the member 8 supports a bracket member 14 adapted to carry suitable cutting torches (not shown) in the usual manner. The bracket may be secured by suitable bolt members 16 as shown.

The actuating mechanism for the ring gear 10 is provided by the pinion gears 18 and 20 which are carried on radial brackets 22 of the track member 8, only one of which is shown. The pinion gears are spaced apart usually a greater distance than that of the slotted throat 12, and are supported by suitable shafts 23 and 24 carried in bearings 25 and 26, respectively. The outer ends of the shafts are provided with sprockets 28 and 30 cooperating with a suitable chain member 32. The shaft 24 carries a gear 33 in turn cooperating with a small gear 34 on a handle member or crank 35. It will be apparent that rotation of the crank will drive the gear 28 and the chain 32 and pinion gears 18 and 20, which in turn rotate the ring gear about the periphery of the pipe to effect an annular cut by the cutting torch (not shown) of the pipe.

The saddle member 4 of the cutting machine 2 is a substantially arcuate member adapted to partially straddle the outer periphery of the pipe on the top side thereof. The saddle 4 is adapted to cooperate with one or more arcuately shaped adapter members 36 which may be secured in axial spaced relationship underneath the saddle 4 as shown in Fig. 3. The saddle is provided with a plurality of apertures for receiving the bolts 38 in order to secure the spacer members thereto. In like manner, the spacer members are provided with a plurality of apertures 39 cooperating with the bolts 38 in any suitable manner.

The saddle member 4 with the spacer adapters secured thereto is secured to the pipe by a suitable chain 40 anchored to one side of the saddle 4 and cooperating with a flexible member 42, preferably of asbestos and leather, having a threaded stud member 43 secured at the opposite end thereof and on which is threadedly secured a handle member 44. One side of the saddle 4 is provided with a suitable bracket 45 having a slot 46 for receiving the tapered portion 47 of the handle 44 and for locking cooperation therewith.

The threaded stud member 43 preferably extends through an elongated or substantially oval shaped aperture 52 (Fig. 3) provided on a metal clip member 54, or the like, one of which is suitably secured at each end of the strap 42. A pin member (not shown) extends transversely through the inner end (not shown) of the stud 43 and contacts the clip member 54 for pivotally retaining the stud member 43 within the aperture 52. The elongated shape of the aperture 52 permits a free swinging of the stud 43 about the axis of the transverse pin member, thereby facilitating utilization of the handle 44 for locking the strap 42 in position, as desired. The tapered portion 47 of the handle 44 is preferably provided with a radius to permit engagement of the handle 44 within the slot 46 at substantially any desired position required for clamping a variety of sizes of pipe.

The adapters are cut from any suitable type of metal and preferably a cast non-ferrous metal to prevent sparking, but not limited thereto, and of a desired size. The outer periphery of the adapters are machined following a central boring to obtain the required diameter of the inner arcuate face 50. The bar stock is then cut into sections to provide arcuate segments forming the adapters, preferably three or four segments, but not limited thereto. It will be apparent that faces 50 on both sides of the adapters 36 are the same radius, thereby providing a substantially perfectly circular fit around the periphery of the pipe in order to maintain the saddle 4 and the accompanying pipe cutting machine on the pipe in a substantially perfect concentricity of alignment and thereby assuring an efficient and true beveling cut of the beveling apparatus.

The saddle member 4 is preferably cast in one piece and centrally bored to provide an accurate inside diameter therefor complementary to the outside of the diameter of the adapters 36. The saddle member 4 is then preferably cut into three segments, but not limited thereto, to provide a plurality of saddle members from one casting. This method of construction provides for an accurate and economical production of the saddle member.

The adapters are preferably usable on small size pipe from one-half inch to four inches, but not limited thereto, and can be secured to the under faces of the saddle member for accurate positioning and support of the cutting apparatus on the pipe. The strap handle 42 and the handle 44 provide a quick acting thumb screw action for tightening and holding the saddle 4 on the pipe. A suitable handle 60 may be provided to assist mounting and removal of the machine respecting the pipe.

From the foregoing, it will be apparent that the present invention contemplates a pipe cutting apparatus having a ring like driven member supported on the pipe by the arcuately shaped saddle member which cooperates with a plurality of horizontally spaced arcuate adapters for properly positioning the saddle in an arcuate face to face contact on the arcuate periphery of the pipe, it being understood that the spacer members are of variable sizes to permit utilization of the saddle with variable size pipe and still maintain an efficient disposition of the saddle member and pipe cutting apparatus thereon, thereby assuring a true cut of the pipe cutting apparatus during its travel around the periphery of the pipe.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. An adapter spacer means for use with a saddle member of a pipe cutting apparatus adapted to straddle the outer periphery of the pipe, said adapter means permitting utilization of the saddle member for smaller sized pipe and comprising axially spaced segmental arcuate members, mating apertures provided in the saddle member and arcuate members, fastening means cooperating with the apertures for securing the arcuate members to the under face of the saddle member, each arcuate member having transversely spaced arcuate pipe contacting portions, said portions having a common radius of curvature provided thereon and complementary to the contour of the outer periphery of the pipe to provide an arcuate face to face contact between the adapter spacer and the pipe, means to secure the saddle member and adapter spacer to the pipe comprising a strap member for substantially encircling the pipe, a stud pivotally secured to the strap member, an adjustable handle provided on the stud member, a bracket member provided on the saddle member and having a recessed portion for receiving the handle for securing the saddle member to the pipe.

2. In a pipe cutting apparatus in combination with a ring like driven member for annular movement around the pipe, a saddle member for supporting the ring member on the pipe, adapter means carried by the saddle to permit using the saddle member on variable sized pipe, said adapter means comprising axially spaced segmental arcuate members, mating apertures provided on the saddle member and the arcuate members, fastening means cooperating with the apertures to permit securing the arcuate members to the under face of the saddle member, each arcuate member having transversely spaced arcuate pipe contacting portions, said portions having a common radius of curvature provided thereon complementary to the contour of the outer periphery of the pipe to provide an arcuate face to face contact between the adapter member and the pipe, means to secure the saddle member and the adapters to the pipe and comprising a strap member for substantially encircling a greater portion of the pipe, means for securing one end of the strap at one side of the saddle member, connector means provided on the opposite side than the first mentioned side of the saddle member, latching means carried by the unsecured end of the strap cooperating with the connector means for securing the strap to the saddle member, and handle means carried by the strap to provide for adjustment of the strap relative to the pipe.

References Cited in the file of this patent

UNITED STATES PATENTS

| | | |
|---|---|---|
| 1,922,409 | Wyss | Aug. 15, 1933 |
| 1,922,529 | Day | Aug. 15, 1933 |
| 1,998,729 | Mathey | Apr. 23, 1935 |

FOREIGN PATENTS

| | | |
|---|---|---|
| 546,009 | Great Britain | June 23, 1942 |